(12) United States Patent
Petronella et al.

(10) Patent No.: US 10,823,307 B2
(45) Date of Patent: Nov. 3, 2020

(54) CONTROL SYSTEM FOR SPOOL VALVE AVOIDING MECHANICAL STRESSES

(71) Applicant: SCHNEIDER ELECTRIC SYSTEMS USA, INC., Foxboro, MA (US)

(72) Inventors: Dimitri Petronella, Thann (FR); Antoine Paulus, Leimbach (FR)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 25 days.

(21) Appl. No.: 16/351,829

(22) Filed: Mar. 13, 2019

(65) Prior Publication Data

US 2020/0292097 A1    Sep. 17, 2020

(51) Int. Cl.
*F16K 31/126* (2006.01)
*F15B 13/04* (2006.01)
*F16K 11/07* (2006.01)
*F15B 13/042* (2006.01)

(52) U.S. Cl.
CPC ...... *F16K 31/1262* (2013.01); *F15B 13/0402* (2013.01); *F15B 13/042* (2013.01); *F16K 11/07* (2013.01); *Y10T 137/8663* (2015.04)

(58) Field of Classification Search
CPC .... F16K 31/1262; F16K 11/07; F16K 31/165; F16K 11/0708; F16K 31/084; F16K 31/086; F15B 13/0402; F15B 13/042
USPC ................. 137/625.66; 251/61, 65
See application file for complete search history.

(56) References Cited

U.S. PATENT DOCUMENTS

| | | | | |
|---|---|---|---|---|
| 2,564,569 A | * | 8/1951 | Goehring | F16K 31/1262 251/61.4 |
| 3,203,439 A | | 8/1965 | Beckett | |
| 3,392,742 A | * | 7/1968 | Diver | F15C 4/00 137/82 |
| 3,410,159 A | * | 11/1968 | Zundel | F16H 59/30 477/156 |
| 3,625,246 A | * | 12/1971 | Reaves | F16K 11/07 137/408 |
| 3,749,128 A | | 7/1973 | Sallberg et al. | |
| 4,325,412 A | | 4/1982 | Hayner | |

(Continued)

FOREIGN PATENT DOCUMENTS

| | | |
|---|---|---|
| CA | 812534 A | 5/1969 |
| DE | 3412746 A1 | 10/1985 |

(Continued)

OTHER PUBLICATIONS

Extended European Search Report for European Application No. 201611985-1015 dated Jul. 21, 2020.

*Primary Examiner* — Umashankar Venkatesan
(74) *Attorney, Agent, or Firm* — Locke Lord LLP

(57) ABSTRACT

A fluid pressure controlled spool valve minimizes abrasion or sticking caused by a tilted orientation of a pressure plate forcing lands of a spool shaft to abrade or stick internally facing surfaces of a cylindrical barrel supporting the spool shaft. A permanent magnet is mounted on the pressure plate. A round head composed of a ferromagnetic material is formed on an end of a spool shaft and configured to be magnetically attracted to the permanent magnet. A magnetic attraction force vector produced on the round head of the spool shaft remains coaxial with an axis of the spool shaft, when the pressure plate and the magnet are tilted with respect to the axis of the spool shaft.

16 Claims, 7 Drawing Sheets

(56) References Cited

U.S. PATENT DOCUMENTS

| | | | |
|---|---|---|---|
| 4,606,317 A | | 8/1986 | Jauch et al. |
| 4,643,228 A | * | 2/1987 | Spencer .................... F16K 3/26 137/269 |
| 5,252,939 A | | 10/1993 | Riefler et al. |
| 5,507,316 A | | 4/1996 | Meyer |
| 6,065,451 A | | 5/2000 | Lebrun |
| 6,729,283 B2 | | 5/2004 | Simpson et al. |
| 7,219,875 B2 | | 5/2007 | Dayton |
| 8,047,502 B2 | * | 11/2011 | Paffrath .................... F01N 3/30 251/61 |
| 8,991,173 B2 | | 3/2015 | Mavir et al. |
| 2019/0154164 A1 | | 5/2019 | Mikota et al. |

FOREIGN PATENT DOCUMENTS

| | | |
|---|---|---|
| EP | 3236123 A1 | 10/2017 |
| WO | WO 2014/011896 A2 | 1/2014 |

* cited by examiner

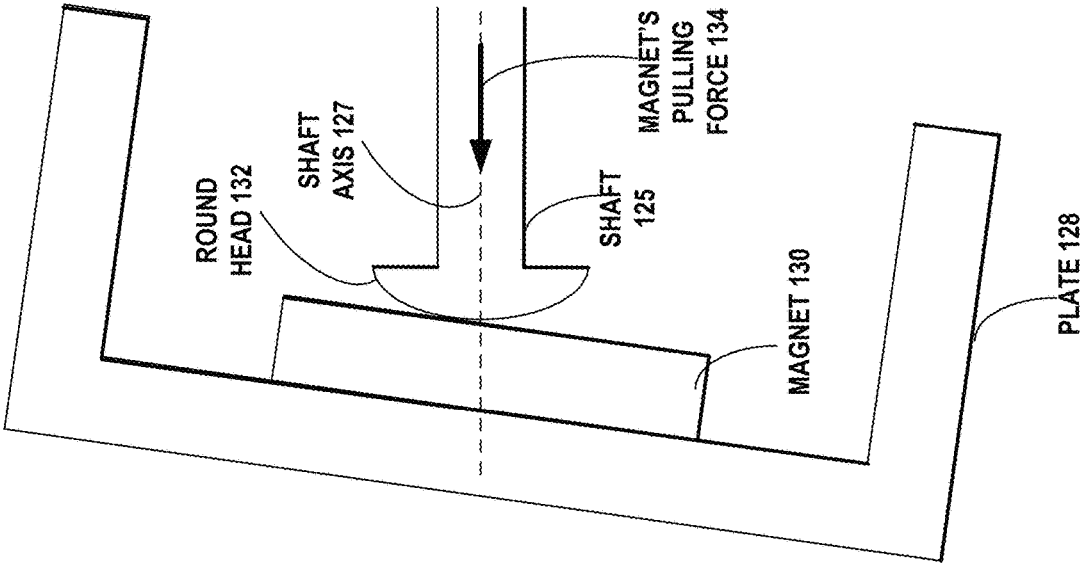
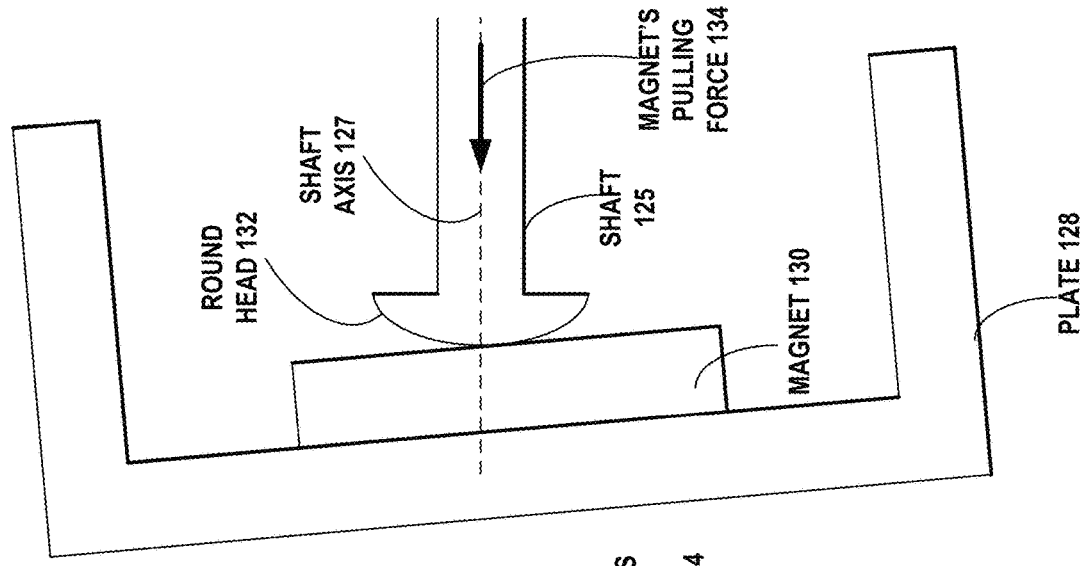
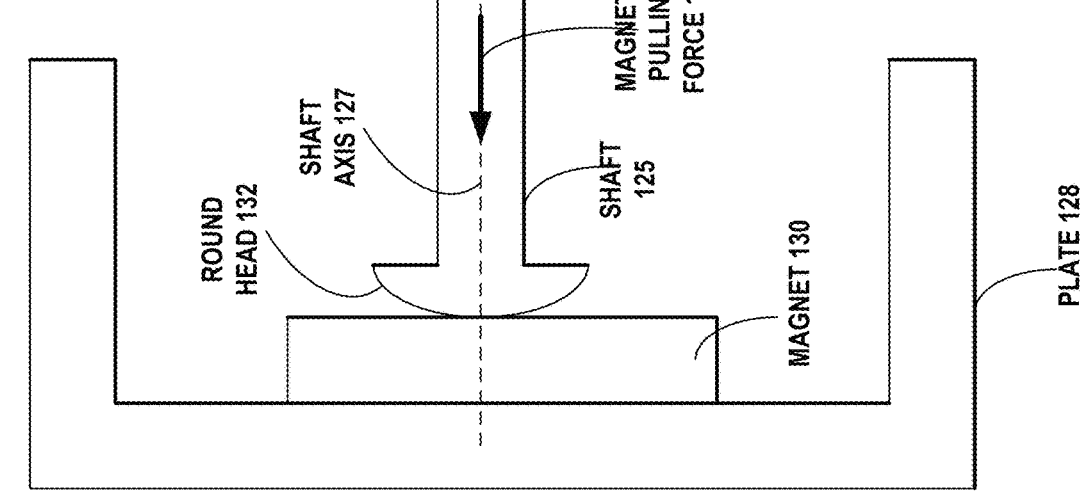

CONTROL SYSTEM FOR SPOOL VALVE AVOIDING MECHANICAL STRESSES

FIELD OF THE INVENTION

The invention disclosed relates to spool valves.

BACKGROUND

Spool valves are used for controlling the direction of flow of fluids in a variety of applications as varied as automobile power steering and ink jet printing. Spool valves comprise a plunger-like spool shaft that slides within a cylindrical barrel that has ports opening in the sides of the barrel. Blocking of the ports is provided by lands or full diameter sections on the spool shaft, separated by narrower sections that provide port interconnections through the cylindrical barrel. Seals are positioned between the ports and on the outer ends of the cylindrical barrel beyond the outermost ports. The sliding action of the spool shaft may be controlled by an electromechanical solenoid or by pneumatic or hydraulic pressure.

In pneumatic or hydraulic pressure control, a control fluid pressure signal is introduced into a control fluid chamber of the valve housing, which is separated from a second chamber by a flexible membrane. A pressure plate located in the second chamber abuts with the flexible membrane and is mechanically connected to one end of the spool shaft. A coil spring located in the second chamber maintains a spring force against the pressure plate directed against the flexible membrane. As the control fluid pressure signal is increased in the control fluid chamber, the flexible membrane expands into the second chamber, pressing on and moving the pressure plate farther into the second chamber, sliding the spool shaft toward an open position. Alternately, as the control fluid pressure signal is decreased in the control fluid chamber, the flexible membrane retracts from the second chamber, pulling on the pressure plate which, in turn, pulls on the mechanical connection to the spool shaft, sliding the spool shaft toward the closed position.

A problem with pneumatic or hydraulic pressure controlled spool valves is that as the flexible membrane is expanded and retracted by changes in the control fluid pressure signal, the pressure plate and its mechanical connection to the spool shaft may become tilted with respect to the axis of the cylindrical barrel. The tilted orientation of the pressure plate and its mechanical connection may cause the lands or full diameter sections on the spool shaft to abrade or stick to the internally facing surface of the cylindrical barrel, causing eventual leakage of the working fluid around the lands, thereby limiting the useful life of the spool valve.

What is needed is a design for pneumatic or hydraulic pressure controlled spool valves that minimizes the abrasion or sticking caused by the tilted orientation of the pressure plate and its mechanical connection.

SUMMARY

In accordance with example embodiments of the invention, a pneumatic or hydraulic pressure controlled spool valve minimizes abrasion or sticking caused by a tilted orientation of a pressure plate forcing lands of a spool shaft to abrade or stick to internally facing surfaces of a cylindrical barrel supporting the spool shaft. A permanent magnet is mounted on the pressure plate in an interior chamber. A round head formed on an end of the spool shaft is composed of a ferromagnetic material and is configured to be magnetically attracted to the permanent magnet. In accordance with the invention, a magnetic attraction force vector produced on the round head of the spool shaft remains coaxial with the axis of the spool shaft, when the pressure plate and the magnet are tilted with respect to the axis of the spool shaft. The attraction force vector produced on the round head of the spool shaft remains coaxial with the axis of the spool shaft, when the pressure of the control fluid is reduced, to minimize abrasion or sticking in the barrel of the spool valve caused by a tilted orientation of the pressure plate. A force vector produced on the round head of the spool shaft when the pressure of the control fluid is increased, pushing the magnet against the round head of the spool shaft, remains coaxial with the axis of the spool shaft.

DESCRIPTION OF THE FIGURES

FIG. 5A shows the pressure plate oriented perpendicularly to shaft axis, and the magnetic attraction force vector produced on the round head of the spool shaft remains coaxial with the axis of the shaft, to minimize abrasion or sticking in the barrel of the spool valve, in accordance with an embodiment of the invention.

FIG. 5B shows the pressure plate oriented with an upward tilt to shaft axis, and the magnetic attraction force vector produced on the round head of the spool shaft remains coaxial with the axis of the shaft, to minimize abrasion or sticking in the barrel of the spool valve, in accordance with an embodiment of the invention.

FIG. 5C shows the pressure plate oriented with a downward tilt to shaft axis, and the magnetic attraction force vector produced on the round head of the spool shaft remains coaxial with the axis of the shaft, to minimize abrasion or sticking in the barrel of the spool valve, in accordance with an embodiment of the invention.

DESCRIPTION OF EMBODIMENTS OF THE INVENTION

Figure 1:
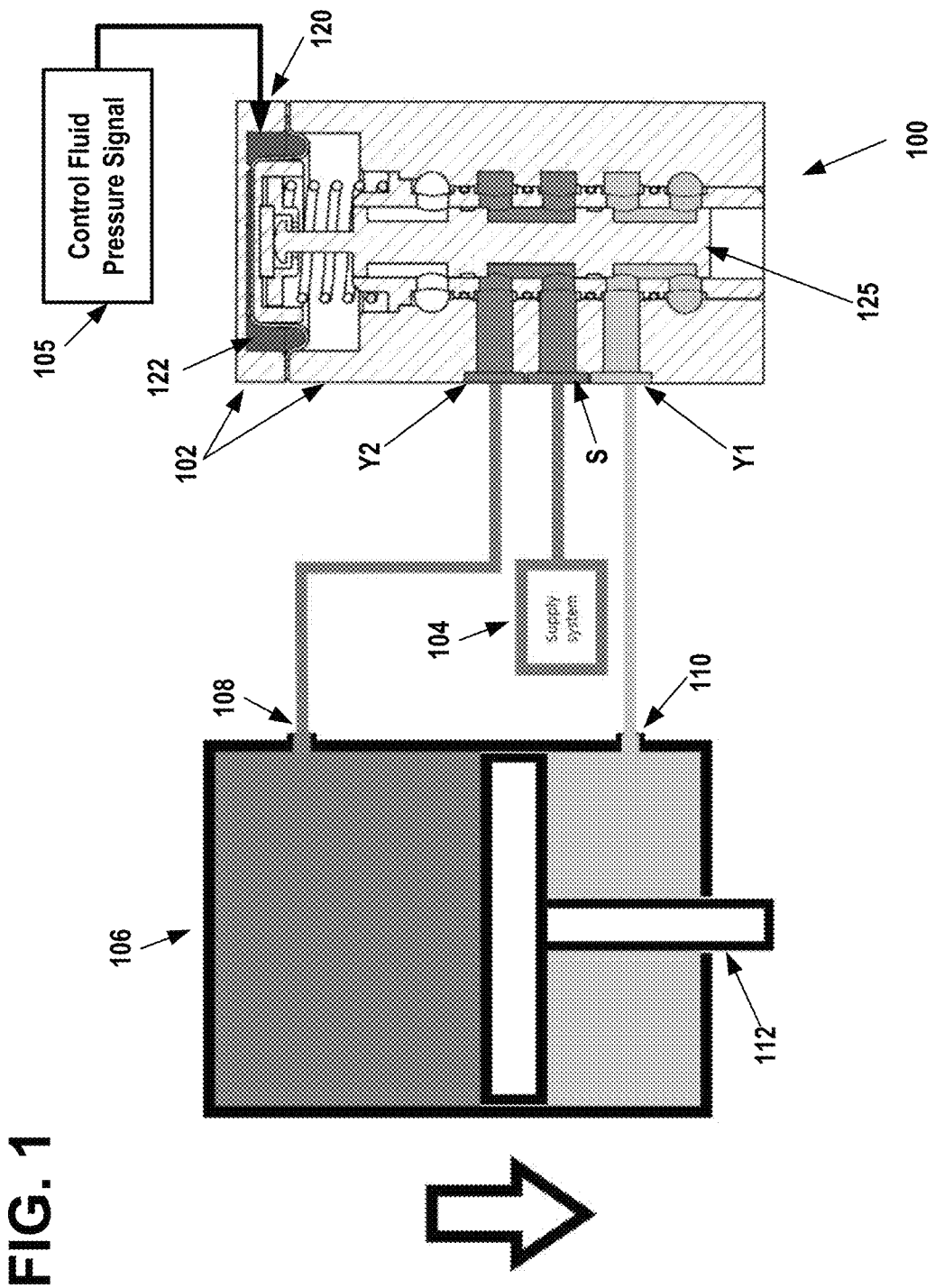
FIG. 1 is an example system diagram showing the control system for a spool valve receiving a control fluid pressure signal to adjust the spool shaft of the spool valve to direct working fluid from a supply system through an output port of the spool valve to a double acting hydraulic actuator, in accordance with an embodiment of the invention.

FIG. 1 is an example system diagram showing the control system for the spool valve 100 receiving a control fluid pressure signal 105 introduced at the control input port 120 into a control fluid chamber 122 of the valve housing 102, which is separated from an inner, second chamber by a flexible membrane. When the pressure of the control fluid 105 is changed in the first chamber 122, the spool shaft 125 slides within the cylindrical barrel of the housing 102, interconnecting or blocking the ports Y1 and Y2, the supply port S, and exhaust ports that open in the sides of the cylindrical barrel. Blocking of the ports is provided by lands or full diameter sections on the spool shaft 125, separated by narrower sections that provide port interconnections through the cylindrical barrel. Seals are positioned between the ports and on the outer ends of the cylindrical barrel beyond the outermost exhaust ports. The sliding action of the spool shaft 125 is controlled by the pneumatic or hydraulic pressure control fluid pressure signal 105.

As the control fluid pressure signal 105 is increased in the control fluid chamber 122, the flexible membrane expands into the second chamber, pressing on and moving the pressure plate farther into the second chamber, sliding the spool shaft 125 to connect the port Y2 to the supply port S and to connect the port Y1 to the exhaust port. Working fluid from the supply system 104 flows through the interconnected supply port S and port Y2 to the port 108 of the double acting hydraulic actuator 106, pushing the piston 112 in the downward direction shown in the figure. Working fluid returned from the port 110 of the double acting hydraulic actuator 106, flows through the interconnected port Y1 and exhaust port supply of the spool valve 100.

Figure 2:
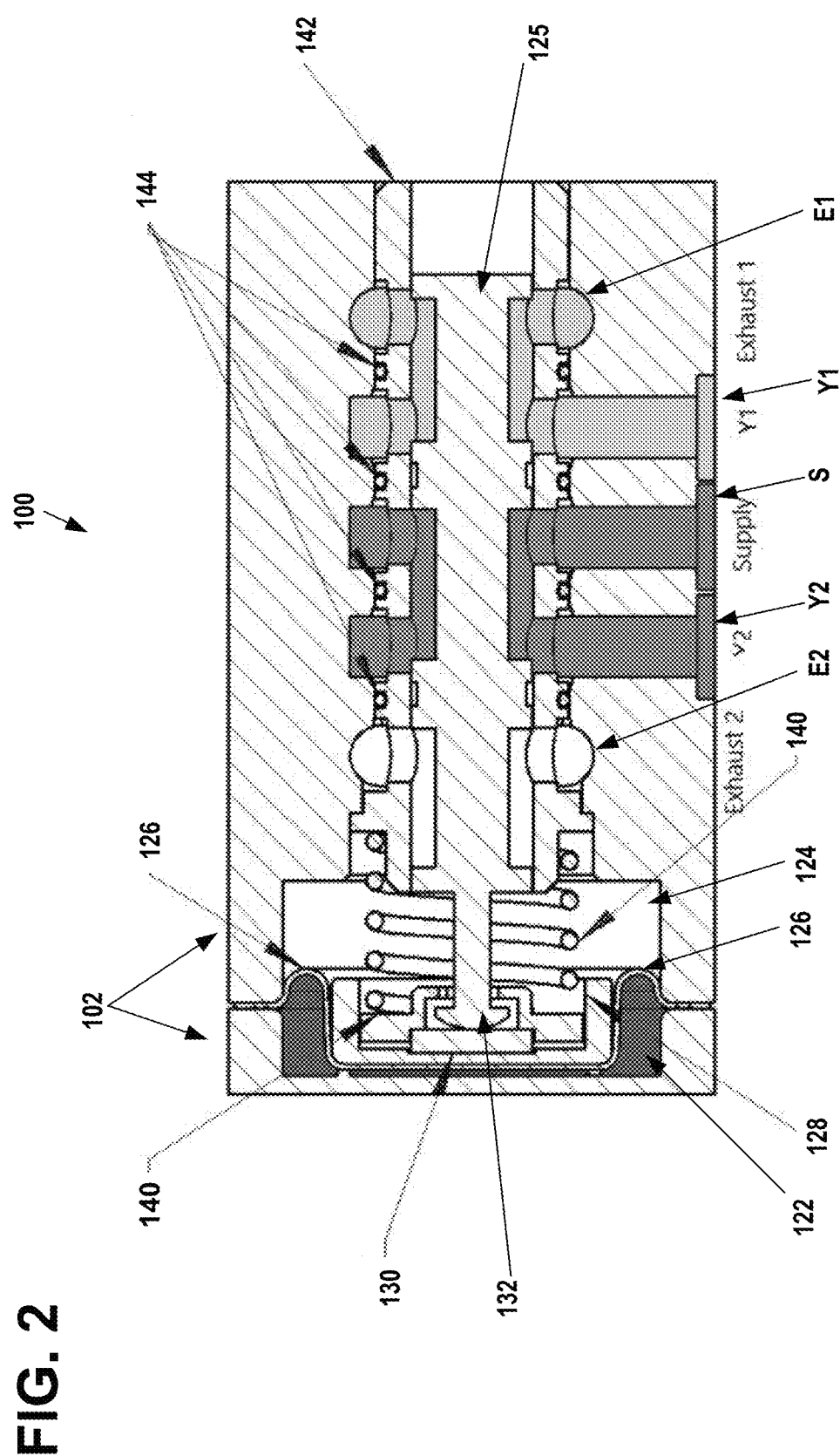
FIG. 2 is a side cross sectional view of the control system for the spool valve with the spool shaft positioned for working fluid flow out of the Y2 port, where the working fluid at the Y1 output port is zero pressure and the working fluid at the Y2 output port is at the supply port pressure. The figure shows the permanent magnet mounted on the pressure plate in an interior chamber and the round head formed on the end of the spool shaft, configured to be magnetically attracted to the permanent magnet. In accordance with the invention, the magnetic attraction force vector produced on the round head of the spool shaft remains coaxial with the axis of the spool shaft, if the pressure plate becomes tilted with respect to the axis of the spool shaft, to minimize abrasion or sticking in the barrel of the spool valve.

FIG. 2 is a side cross sectional view of the control system for the spool valve 100. The spool shaft 125 is positioned by the control fluid pressure signal 105 in the control fluid chamber 122, to connect the supply port S to the Y2 port and connect the Y1 port to the exhaust port E1. The working fluid at the Y1 output port is at zero pressure and the working fluid at the Y2 output port is at the pressure of the supply port S. The figure shows the permanent magnet 130 mounted on the pressure plate 128 in the inner, second chamber 124 and the round head 132 formed on the end of the spool shaft 125, configured to be magnetically attracted to the permanent magnet 130. In accordance with the invention, the magnetic attraction force vector produced on the round head 132 of the spool shaft 125 remains coaxial with the axis of the spool shaft 125, if the pressure plate 128 becomes tilted with respect to the axis of the spool shaft 125, to minimize abrasion or sticking in the cylindrical barrel of the spool valve 100.

The round head 132 formed on the end of the spool shaft 125 may be composed of a ferromagnetic material, such as an alloy of iron, cobalt or nickel. The permanent magnet 130 may be composed of an alloy of neodymium, iron and boron. The round head 132 is configured to be magnetically attracted to the permanent magnet 130. In accordance with the invention, a magnetic attraction force vector produced on the round head 132 of the spool shaft 125 remains coaxial with the axis of the spool shaft 125, when the pressure plate 128 and the magnet 130 are tilted with respect to the axis of the spool shaft 125. The attraction force vector produced on the round head 132 of the spool shaft 125 remains coaxial with the axis of the spool shaft 125, when the pressure of the control fluid 105 is reduced in the control fluid chamber 122, to minimize abrasion or sticking in the cylindrical barrel of the spool valve 100 caused by a tilted orientation of the pressure plate 128.

Moreover, a force vector produced on the round head 132 of the spool shaft 125 when the pressure of the control fluid 105 is increased in the control fluid chamber 122, pushing the surface of the magnet 130 against the surface of the round head 132 of the spool shaft 125, remains coaxial with the axis of the spool shaft 125, to minimize abrasion or sticking in the cylindrical barrel of the spool valve 100 caused by a tilted orientation of the pressure plate 128. The composition of the material for the magnet 130 and the composition for the material of the round head 132 may be chosen to maximize their hardness and resistance to abrasion or sticking due to their contacting surfaces when the pressure of the control fluid 105 is increased in the control fluid chamber 122. The round head 132 may be contoured to have a hemispherical surface, to minimize any component of force transverse to the axis of the spool shaft 125 when the surface of the magnet 130 pushes against the surface of the round head 132 of the spool shaft 125.

The figure shows a coil spring 140 located in the interior, second chamber 124, which maintains a spring force against the pressure plate 128 directed against the flexible membrane 126. The figure shows a bushing 142 positioned around the spool shaft 125 to support the spool shaft in the cylindrical barrel of the housing 102. The figure shows seals 144 positioned between the ports Y1, Y2, S, E1 and E2 between the bushing 142 and the cylindrical barrel of the housing 102.

Figure 3:
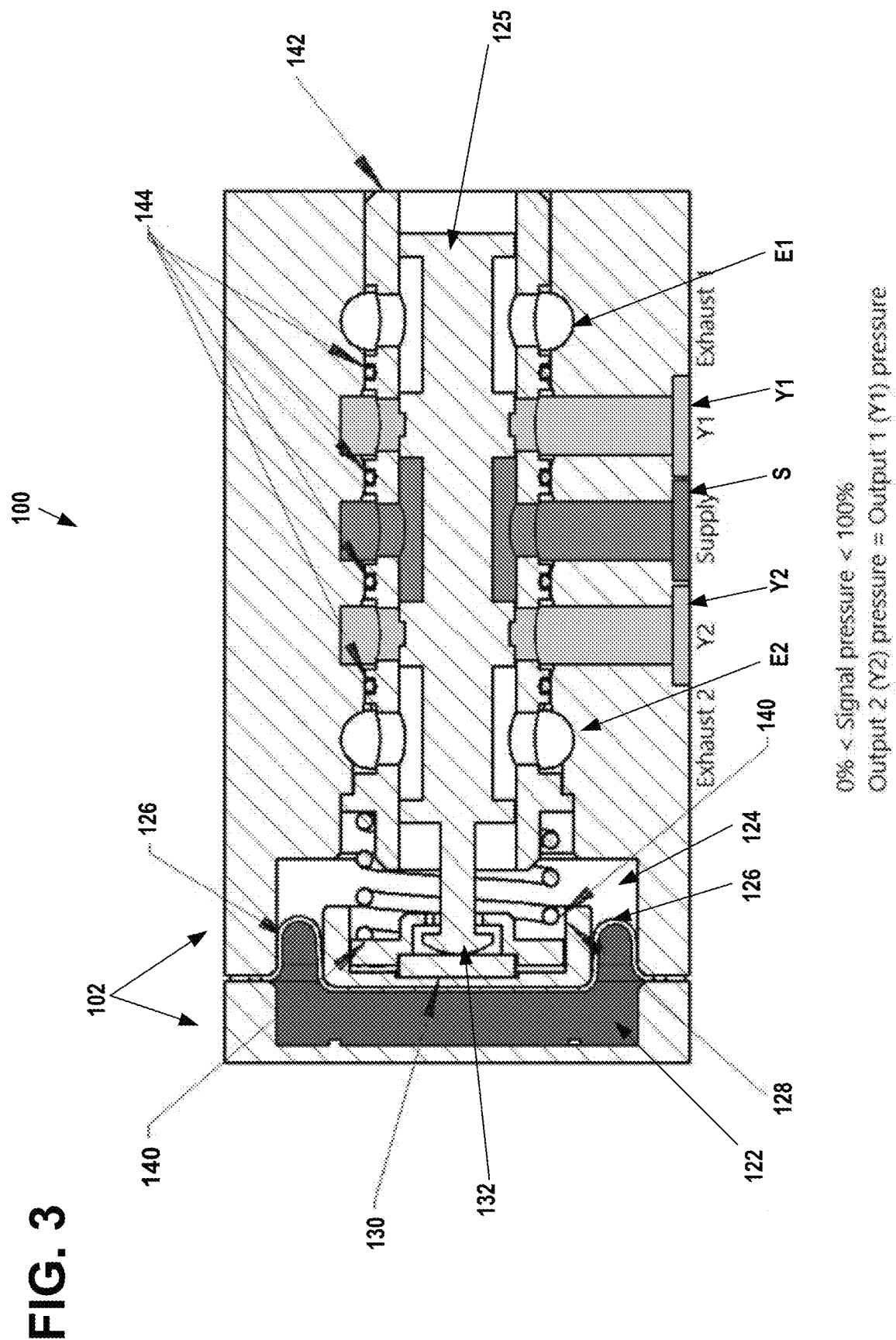
FIG. 3 is a side cross sectional view of the control system for the spool valve of FIG. 2, with the control fluid pressure signal increased to adjust the spool shaft of the spool valve to be positioned at a cross point where the working fluid has equal pressures at the Y1 port and the Y2 port, in accordance with an embodiment of the invention.

FIG. 3 is a side cross sectional view of the control system for the spool valve 100 of FIG. 2, with the control fluid pressure signal 105 increased to adjust the spool shaft 125 of the spool valve 100 to be positioned at a cross point where the working fluid has equal pressures at the Y1 port and the Y2 port, in accordance with an embodiment of the invention.

Figure 4:
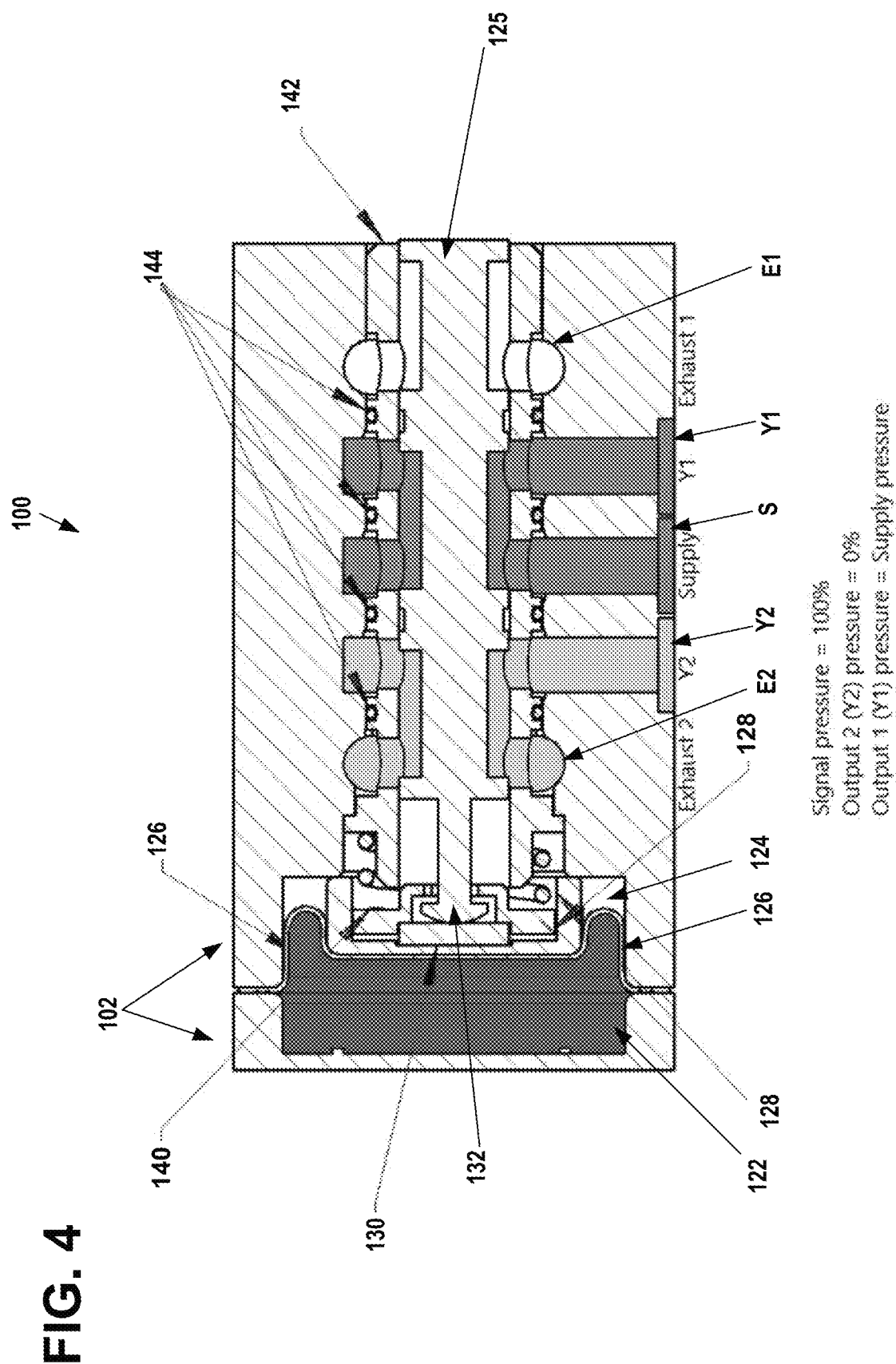
FIG. 4 is a side cross sectional view of the control system for the spool valve of FIG. 3, with the control fluid pressure signal further increased to adjust the spool shaft of the spool valve to be positioned where the working fluid at the Y2 output port is zero pressure and the working fluid at the Y1 output port is at the supply port pressure, in accordance with an embodiment of the invention.

FIG. 4 is a side cross sectional view of the control system for the spool valve 100 of FIG. 3, with the control fluid pressure signal 105 further increased to adjust the spool shaft 125 of the spool valve 100 to be positioned where the working fluid at the Y2 port is zero pressure and the working fluid at the Y1 port is at the supply port S pressure, in accordance with an embodiment of the invention.

FIG. 5A shows the pressure plate 128 oriented perpendicularly to shaft axis 127, and the magnetic attraction force vector 134 produced on the round head 132 of the spool shaft 125 remains coaxial with the axis 127 of the shaft, to minimize abrasion or sticking in the cylindrical barrel of the spool valve 100, in accordance with an embodiment of the invention.

FIG. 5B shows the pressure plate 128 oriented with an upward tilt to shaft axis 127, and the magnetic attraction force vector 134 produced on the round head 132 of the spool shaft 125 remains coaxial with the axis 127 of the shaft, to minimize abrasion or sticking in the cylindrical barrel of the spool valve 100, in accordance with an embodiment of the invention.

FIG. 5C shows the pressure plate 128 oriented with a downward tilt to shaft axis 127, and the magnetic attraction force vector 134 produced on the round head 132 of the spool shaft 125 remains coaxial with the axis 127 of the shaft, to minimize abrasion or sticking in the cylindrical barrel of the spool valve 100, in accordance with an embodiment of the invention.

Figure 6:
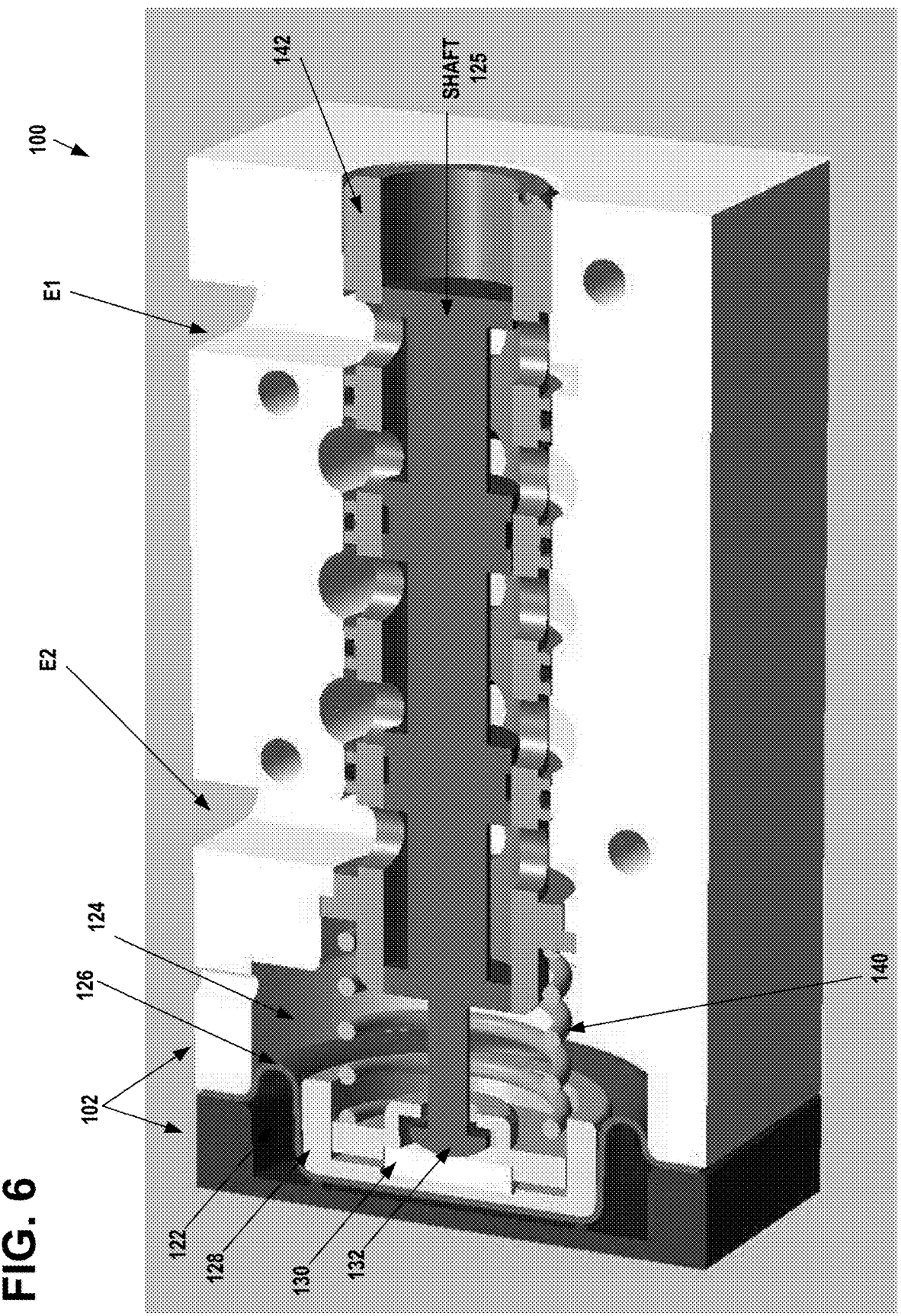
FIG. 6 is three-dimensional, side cross sectional view of the control system for the spool valve, showing the exhaust ports E1 and E2 for the spool valve.

FIG. 6 is three-dimensional, side cross sectional view of the control system for the spool valve 100, showing the exhaust ports E1 and E2 for the spool valve 100. The figure shows the permanent magnet 130 mounted on the pressure plate 128 in the inner, second chamber 124 and the round head 132 formed on the end of the spool shaft 125, configured to be magnetically attracted to the permanent magnet 130.

Figure 7:
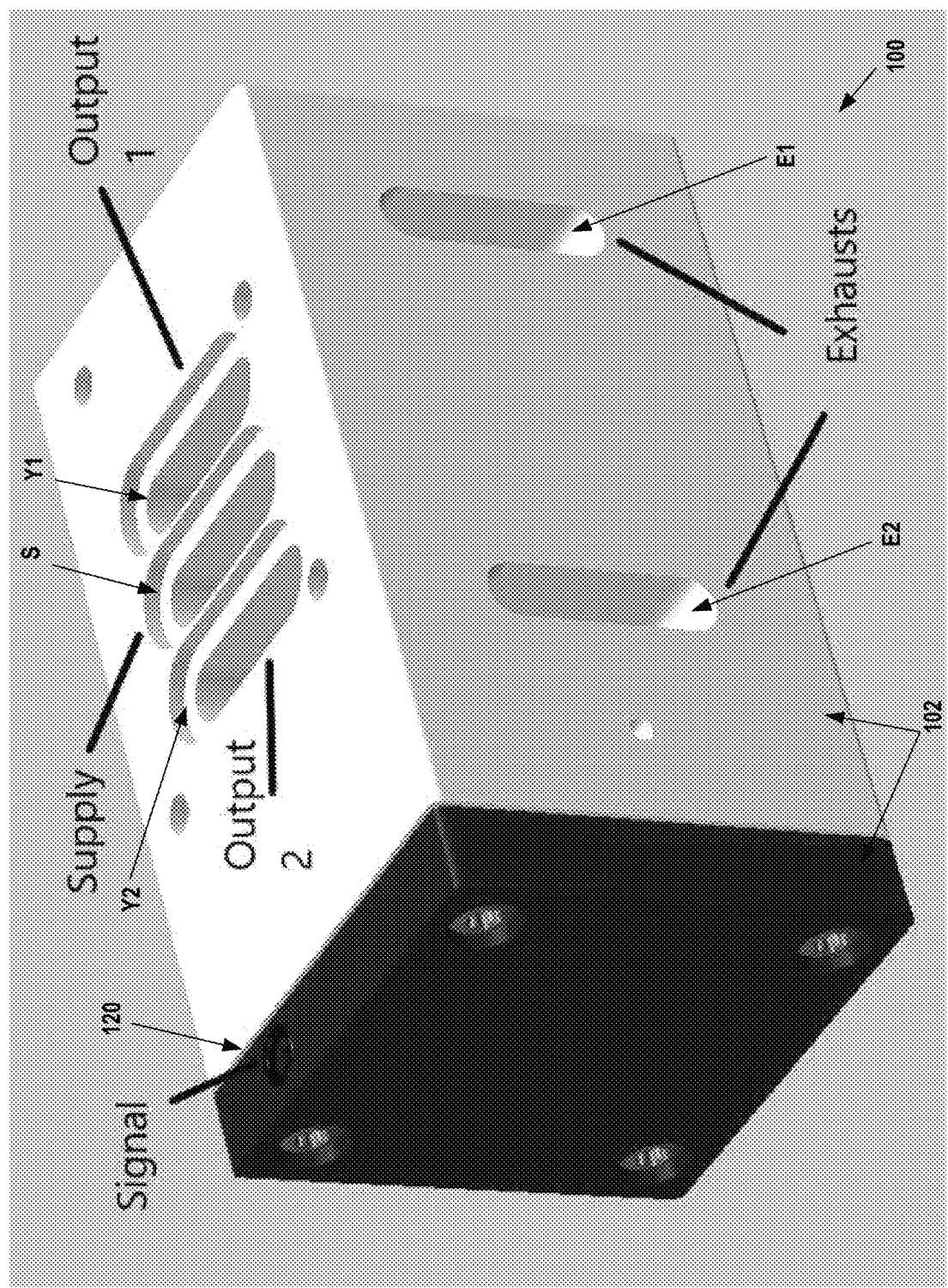
FIG. 7 is three-dimensional, side view of the spool valve, showing the control fluid pressure signal port, the working fluid input ports Y1 and Y2, the working fluid supply port, and the working fluid exhaust ports for the spool valve.

FIG. 7 is three-dimensional, side view of the spool valve, showing the control fluid pressure signal port 120, the working fluid ports Y1 and Y2, the working fluid supply port S, and the working fluid exhaust ports E1 and E2 for the spool valve 100.

Although specific example embodiments of the invention have been disclosed, persons of skill in the art will appreciate that changes may be made to the details described for the specific example embodiments, without departing from the spirit and the scope of the invention.

The invention claimed is:

1. A spool valve control, comprising:
 a housing including a first chamber for receiving a control fluid and a second chamber for supporting a spool shaft having an axis, the spool shaft configured to move along the axis;
 a flexible membrane separating the first and second chambers, configured to form a flexible barrier to the control fluid in the first chamber;
 a pressure plate in the second chamber against which the flexible membrane presses in response to changes in pressure of the control fluid;
 a permanent magnet mounted on the pressure plate in the second chamber; and
 a round head formed on an end of the spool shaft and composed of a ferromagnetic material, configured to be magnetically attracted to the permanent magnet;
 wherein a magnetic attraction force vector produced on the round head of the spool shaft by the permanent magnet, remains coaxial with the axis of the shaft, when the pressure plate and the magnet are tilted with respect to the axis of the spool shaft.

2. The spool valve control of claim 1, wherein the attraction force vector produced on the round head of the spool shaft, remains coaxial with the axis of the shaft, when the pressure of the control fluid is reduced in the first chamber.

3. The spool valve control of claim 1, wherein a force vector produced on the round head of the spool shaft when the pressure of the control fluid is increased in the first chamber, pushing the magnet against the round head of the spool shaft, remains coaxial with the axis of the spool shaft.

4. The spool valve control of claim 1, wherein the round head formed on the end of the spool shaft is composed of an alloy of iron, cobalt or nickel.

5. The spool valve control of claim 1, wherein the permanent magnet is composed of an alloy of neodymium, iron and boron.

6. The spool valve control of claim 1, wherein the composition of the material for the magnet and the composition for the material of the round head maximizes their hardness and resistance to abrasion or sticking due to their surfaces contacting when the pressure of the control fluid is increased in the first chamber.

7. The spool valve control of claim 1, wherein the round head is contoured to have a hemispherical surface, to minimize any component of force transverse to the axis of the spool shaft when the surface of the magnet pushes against the surface of the round head of the spool shaft.

8. The spool valve control of claim 1, wherein abrasion or sticking is minimized that is caused by a tilted orientation of the pressure plate forcing lands of the spool shaft to cause abrasion of internally facing surfaces of a cylindrical barrel supporting the spool shaft in the housing.

9. In a spool valve including a flexible membrane separating a control fluid chamber and an interior chamber, and a pressure plate in the interior chamber against which the flexible membrane presses in response to changes in pressure of control fluid in the control fluid chamber, a spool valve control, comprising:
 a permanent magnet mounted on the pressure plate in the interior chamber; and
 a round head formed on an end of a spool shaft in the interior chamber, the round head composed of a ferromagnetic material, configured to be magnetically attracted to the permanent magnet;
 wherein a magnetic attraction force vector produced on the round head of the spool shaft by the permanent magnet, remains coaxial with an axis of the spool shaft, when the pressure plate and the magnet are tilted with respect to the axis of the spool shaft.

10. The spool valve control of claim 9, wherein the attraction force vector produced on the round head of the spool shaft, remains coaxial with the axis of the shaft, when the pressure of the control fluid is reduced in the first chamber.

11. The spool valve control of claim 9, wherein a force vector produced on the round head of the spool shaft when the pressure of the control fluid is increased in the first chamber, pushing the magnet against the round head of the spool shaft, remains coaxial with the axis of the spool shaft.

12. The spool valve control of claim 9, wherein the round head formed on the end of the spool shaft is composed of an alloy of iron, cobalt or nickel.

13. The spool valve control of claim 9, wherein the permanent magnet is composed of an alloy of neodymium, iron and boron.

14. The spool valve control of claim 9, wherein the composition of the material for the magnet and the composition for the material of the round head maximizes their hardness and resistance to abrasion or sticking due to their surfaces contacting when the pressure of the control fluid is increased in the first chamber.

15. The spool valve control of claim 9, wherein the round head is contoured to have a hemispherical surface, to minimize any component of force transverse to the axis of the spool shaft when the surface of the magnet pushes against the surface of the round head of the spool shaft.

16. The spool valve control of claim 9, wherein abrasion or sticking is minimized that is caused by a tilted orientation of the pressure plate forcing lands of the spool shaft to cause abrasion of internally facing surfaces of a cylindrical barrel supporting the spool shaft in the housing.

* * * * *